350-173.
1-29-74 XR 3,789,135
SR

United States Patent [19]

Bachmann

[11] 3,789,135

[45] Jan. 29, 1974

[54] OPTICAL SYSTEM FOR COLOR TELEVISION CAMERAS

[75] Inventor: Horst Bachmann, Darmstadt, Germany

[73] Assignee: Fernseh GmbH Darmstadt, Darmstadt, Germany

[22] Filed: May 16, 1972

[21] Appl. No.: 253,814

Related U.S. Application Data

[63] Continuation-in-part of Ser. No. 85,923, Nov. 2, 1970, abandoned.

[30] Foreign Application Priority Data

May 19, 1971 Germany.................. P 21 24 964.9

[52] U.S. Cl. .............................. 178/5.4 E, 350/173
[51] Int. Cl. .............................. H04n 9/08
[58] Field of Search..... 128/5.4 E, 5.4 TC; 350/173; 178/7.91

[56] References Cited

UNITED STATES PATENTS 3,333,053 7/1967 Back ................................ 350/173
3,546,371 12/1970 Tan ................................ 178/5.4 E
3,586,760 6/1971 Dillenburger.................. 178/5.4 TC

*Primary Examiner*—Robert L. Richardson
*Attorney, Agent, or Firm*—Littlepage, Quaintance, Murphy & Dobyns

[57] ABSTRACT

An optical system for a color television camera comprises a beam-splitting arrangement for separating an incident light beam from a main objective lens into three partial beams corresponding respectively to three different parts of the visible spectrum, the three partial beams being supplied to the photoelectric cathodes of respective camera tubes. One of the partial beams is supplied to the respective photoelectric cathode by way of an intermediate lens, so that the size of the image on the photoelectric cathode is different from the size of the images on the other two photoelectric cathodes. A deflector is added to allow placement of the reduced image size camera tube perpendicular to the main objective lens.

3 Claims, 3 Drawing Figures

OPTICAL SYSTEM FOR COLOR TELEVISION CAMERAS

CROSS-REFERENCE TO RELATED APPLICATIONS

This application is a continuation-in-part of my prior co-pending application Ser. No. 85,923, filed Nov. 2, 1970 and now abandoned.

BACKGROUND OF THE INVENTION

The invention relates to an optical system for color television cameras.

In my prior co-pending application Ser. No. 85,923 cited above, there is disclosed an optical system for color television cameras. That system has a main objective lens and a first prism with a first surface through which luminous flux entering from the main objective lens penetrates the first prism. The first prism has a second surface on which a first dichroic layer is provided which reflects a partial luminous flux in the middle portion of the luminous spectrum, which partial luminous flux is totally reflected on the first surface to emerge from a third surface of the first prism and arrive at the photosensitive surface of a first camera tube. The flux produces an image of the object in the middle portion of the luminous spectrum on the first camera tube. The system includes a second prism with a first surface, which, with interpolation of an airgap, is positioned parallel to the second surface of the first prism. A second surface of the second prism has thereon a second dichroic layer which is penetrated in the long-wave portion of the luminous spectrum by a partial luminous flux which arrives at the photosensitive surface of a second camera tube. The second dichroic layer reflects a partial luminous flux in the short-wave portion of the luminous spectrum, which is totally reflected on the first surface of the second prism and emerges through a third surface of the second prism. At the third surface this short-wave partial luminous flux is deflected approximately into the direction of the axis of the main objective lens. By means of an intermediate optical device, an image of the object is produced on the photosensitive surface of a third camera tube at a different scale of reproduction than those of the photosensitive surfaces of the second and first camera tube.

Such an optical system, however, is of very great structural length, due to the coaxial arrangement of the intermediate optical device and of a third camera tube, which may be a disadvantage in some uses. This is the case especially when the camera housing must be kept particularly small for practical use, for instance when the camera is used for on-the-spot news coverage or in the medical field.

SUMMARY OF THE INVENTION

The present invention is an improvement of my prior disclosed invention and provides an improved optical system for a color television camera in such a way that the outside dimensions of the camera housing can be kept small, while the quality of the picture-taking remains high. The height of the camera housing depends predominantly on the position and longitudinal extension of the camera tube which receives the light from the first prism of the beam splitter by the reflection of a partial luminous flux. Therefore, it is advantageous to arrange preferably the third camera tube for the reception of a short-wave partial flux in a direction in the camera housing which extends approximately perpendicularly to the axis of the object to be photographed.

The preferred embodiment of the invention comprises an optical system for color television cameras. The system has a main objective lens, and a first prism with a first surface through which the luminous flux entering from the main objective lens enters the first prism. A second surface of the first prism in which a first dichroic layer is provided reflects a partial luminous flux in the middle portion of the luminous spectrum, which partial luminous flux is totally reflected on the first surface to emerge from a third surface of the first prism, to arrive at the photosensitive surface of a first camera tube, and to produce thereon an image of the object in the middle portion of the luminous spectrum. The system has a second prism with a first surface which, with interpolation of an airgap, is positioned parallel to the second surface of the first prism. A second surface of the second prism has a second dichroic layer thereon which is penetrated in the long-wave portion of the luminous spectrum by a partial luminous flux which arrives at the photosensitive surface of a second camera tube. The second dichroic layer reflects a partial luminous flux in the short-wave portion of the luminous spectrum, which is totally reflected on the first surface of the second prism and emerges through a third surface of the second prism. At the third surface, this short-wave partial luminous flux is deflected approximately into the direction of the axis of the main objective lens. By means of an intermediate optical device, an image of the object is produced on the photosensitive surface of a third camera tube at a different scale than those on the photosensitive surfaces of the second and first camera tube, as in my prior invention. According to the improved invention, the short-wave partial luminous flux is deflected before arrival at the third camera tube into a direction approximately perpendicular to the axis of the main objective lens.

According to a preferred embodiment, the deflection of the short-wave partial luminous flux takes place in the path of rays after the intermediate optical device.

According to the invention, it is particularly advantageous to provide a prism in the path of rays after the intermediate optical device, for deflecting the partial luminous flux of short-wave length.

DESCRIPTION OF THE PREFERRED EMBODIMENT

Figure 1:
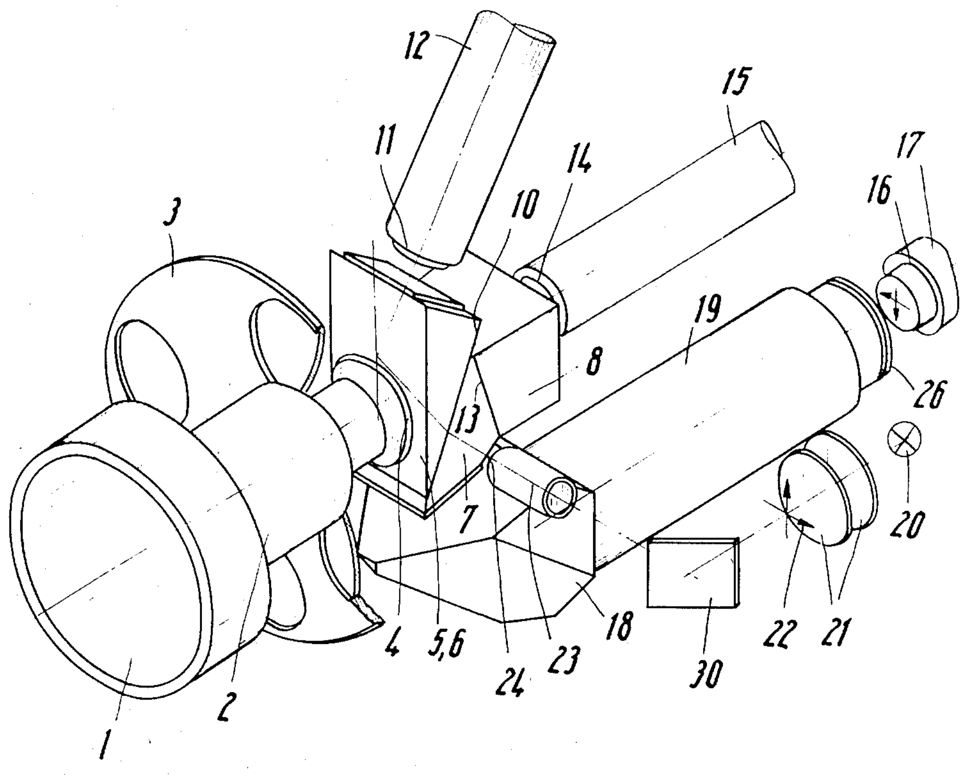
FIG. 1 illustrates the optical system proposed in my prior co-pending application.

In FIG. 1 luminous flux entering through a front lens 1 of a main objective lens 2 penetrates through two filters 3 and 4 and through a surface 5 of a first prism 6 of the beam splitting system which consists of prisms 6, 7, and 8. The adjacent surfaces of prisms 6 and 7 are separated by a narrow airgap. A first dichroic layer which reflects the middle portion of the luminous spectrum is provided on a surface 10 of prism 6. This partial luminous flux is conveyed, by total reflection on surface 5, to a photoelectric cathode 11 of a television camera tube 12. The portion of the spectrum which passes through the dichroic layer 10 is once more split at a surface 13 of prism 7, which is provided with a second dichroic layer. The long-wave (red) portion passes through dichroic layer 13 and arrives at a photoelectric cathode 14 of a camera tube 15.

The short-wave (blue) portion of the spectrum reflected by dichroic layer 13 emerges, after total reflection on the surface of prism 7 that faces the airgap, from this prism and, after being deflected by a roof-edge prism 18, enters an intermediate objective lens 19, which produces on the photosensitive layer 16 of camera tube 17, an image in the blue spectrum range, at a smaller scale than those of the images on the photosensitive layers 11 and 14 of the camera tubes 12 and 15. A field lens is arranged between prism 7 and roof-edge prism 18. A filter serves, if necessary, for adjusting the blue spectrum range to the spectrum distribution desired.

Figure 2:
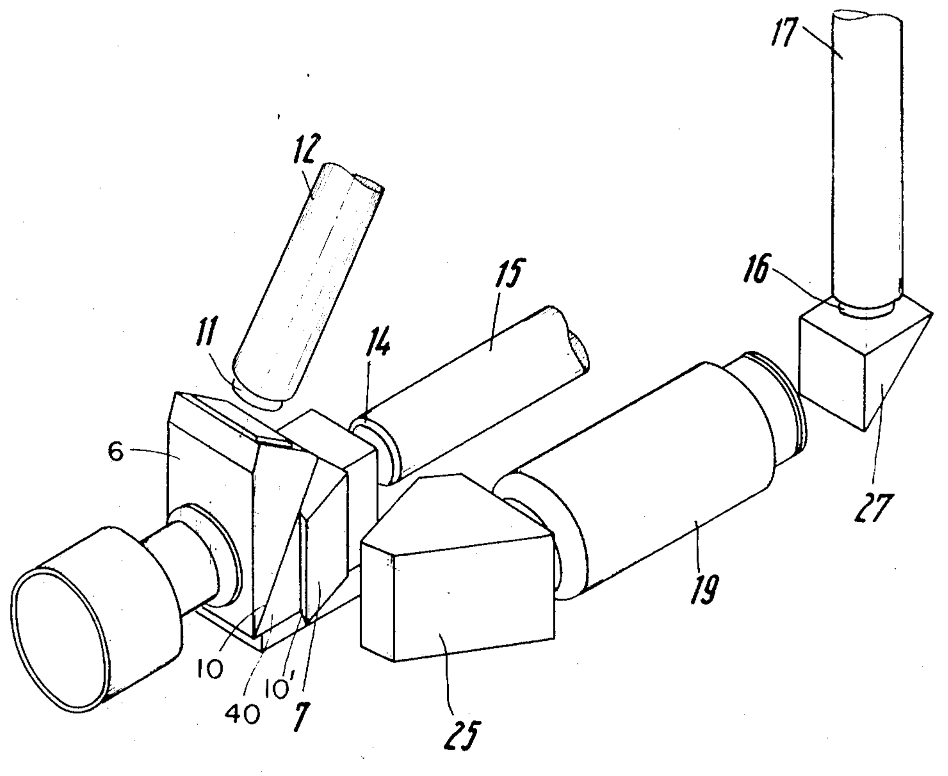
FIG. 2 is a perspective view of an optical system according to my improved invention.

FIG. 2 shows the optical system of the present invention in perspective view. Some identical elements are provided with the same reference symbols as in FIG. 1. As in FIG. 1, light leaves prism 6 (through an exit surface 10) and enters prism 7 (through an entry surface 10'). However, since prism 7 in FIG. 2 is rotated 90° with respect to prism 7 in FIG. 1 (as is illustrated), a glass wedge 40 is inserted (as illustrated) between surfaces 10 and 10'. However, wedge 40 does not affect the color dividing properties of the system. The short-wave partial luminous flux emerging from prism 7 is first deflected by a prism 25 into the intermediate objective lens 19 which, in order to achieve a compact construction, is arranged approximately in the direction of the axis of the main objective. The luminous flux of the blue spectrum range is deflected, with insertion of a prism 27, in such a manner that the camera tube 17 can be arranged approximately perpendicularly to the axis of the main objective lens. By this arrangement the structural length of the entire camera is substantially reduced, which is of great advantage in the case of color cameras in, for example, the medical field. Beyond this, the division of the functions of roof-edge prism 18 of the already proposed optical system into two single prisms 25 and 27 presents considerable advantages in the manufacture and assembling.

Figure 3:
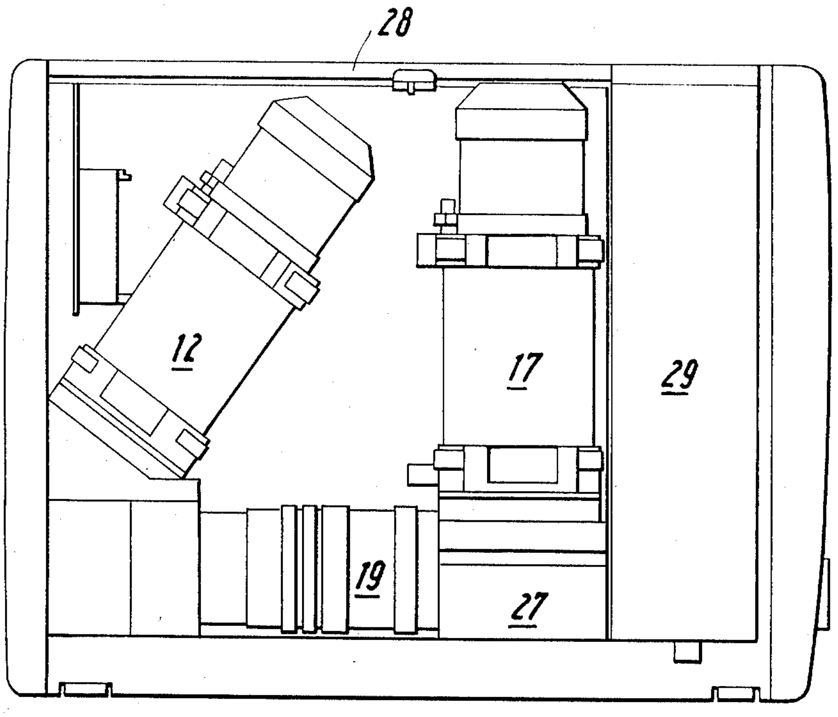
FIG. 3 is a diagram of the housing of a three-tube color television camera without illustration of the pickup objective lens but with the camera tubes illustrated therein.

FIG. 3 shows diagrammatically the arrangement of the camera tubes in a camera housing 28. It can be clearly recognized that the arrangement, according to the invention, of prism 27 after the intermediate objective lens 19 and behind the optical system leaves a free space 29 for holding other structural elements, e.g., an electronic detector. Thus it is possible to incorporate the large-area image-reproducing tube of the detector organically into a relatively small housing. There is sufficient space to the side of the camera tube 17 for the neck of an image-reproducing tube with its deflection system.

What is claimed is:

1. In an optical system for color television cameras comprising:

A. a main objective lens,

B. a first prism comprising:

B1. a first surface of the first prism through which luminous flux entering from the main objective lens penetrates the first prism, B2. a second surface of the first prism whereon there is a first dichroic layer which reflects a partial luminous spectrum, which luminous flux is totally reflected on the first surface, and B3. a third surface of the first prism from which the flux reflected from the first surface emerges arrives at the photosensitive surface of C. a first camera tube having a photosensitive surface on which the flux emerging from the third surface arrives to produce thereon an image of the object in the middle portion of the luminous spectrum, D. a second prism having D1. a first surface of the second prism which, with interpolation of an airgap, is positioned parallel to the second surface of the first prism, D2. a second surface of the second prism whereon there is a second dichroic layer which is penetrated in the long-wave portion of the luminous spectrum by a partial luminous flux which arrives at the photosensitive surface of a second camera tube; and which layer reflects a partial luminous flux in the short-wave portion of the luminous spectrum, which is totally reflected on the first surface of the second prism, 2. An optical system according to claim 1, further comprising deflecting means for deflecting a short-wave partial luminous flux toward an intermediate objective lens before its arrival at the third camera tube.

3. An optical system according to claim 1 wherein the deflecting means is a prism (27).

* * * * *